United States Patent
Itano et al.

(10) Patent No.: US 8,023,025 B2
(45) Date of Patent: Sep. 20, 2011

(54) PHOTOELECTRIC CONVERSION APPARATUS AND IMAGE PICKUP SYSTEM USING THE SAME

(75) Inventors: Tetsuya Itano, Zama (JP); Takanori Watanabe, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 11/772,540

(22) Filed: Jul. 2, 2007

(65) Prior Publication Data
US 2008/0030612 A1 Feb. 7, 2008

(30) Foreign Application Priority Data
Aug. 1, 2006 (JP) ................................. 2006-209754

(51) Int. Cl.
*H04N 3/14* (2006.01)
(52) U.S. Cl. ........................................................ 348/308
(58) Field of Classification Search .......... 348/308–310
See application file for complete search history.

(56) References Cited

U.S. PATENT DOCUMENTS

| | | | |
|---|---|---|---|
| 6,670,990 B1 * | 12/2003 | Kochi et al. ............... | 348/310 |
| 6,914,631 B2 * | 7/2005 | Udo et al. ................... | 348/301 |
| 6,977,684 B1 | 12/2005 | Hashimoto et al. | |
| 7,016,089 B2 | 3/2006 | Yoneda et al. | |
| 7,116,365 B1 | 10/2006 | Ueno et al. ................ | 348/308 |
| 7,126,102 B2 | 10/2006 | Inoue et al. .............. | 250/214 R |
| 7,268,331 B2 | 9/2007 | Koyama .................... | 250/208.1 |
| 7,391,453 B2 * | 6/2008 | Ohkawa ...................... | 348/302 |
| 2001/0012133 A1 | 8/2001 | Yoneda et al. | |
| 2003/0137594 A1 | 7/2003 | Koizumi et al. ........... | 348/308 |
| 2004/0141077 A1 * | 7/2004 | Ohkawa .................... | 348/308 |
| 2005/0179796 A1 | 8/2005 | Okita et al. | |
| 2005/0185074 A1 | 8/2005 | Yoneda et al. | |
| 2005/0237405 A1 | 10/2005 | Ohkawa | |
| 2005/0248675 A1 | 11/2005 | Hashimoto et al. | |
| 2006/0001751 A1 * | 1/2006 | Abe et al. ................. | 348/300 |
| 2006/0043393 A1 * | 3/2006 | Okita et al. .............. | 257/93 |
| 2006/0044439 A1 | 3/2006 | Hiyama et al. | |
| 2006/0132633 A1 | 6/2006 | Nam et al. | |
| 2006/0175536 A1 | 8/2006 | Kim et al. | |
| 2006/0208161 A1 | 9/2006 | Okita et al. .............. | 250/208.1 |
| 2006/0208291 A1 | 9/2006 | Koizumi et al. .......... | 257/292 |
| 2006/0208292 A1 | 9/2006 | Itano et al. ............... | 257/292 |
| 2006/0221667 A1 | 10/2006 | Ogura et al. ............. | 365/149 |

FOREIGN PATENT DOCUMENTS

GB 2 432 045 A 5/2007

(Continued)

*Primary Examiner* — Sinh Tran
*Assistant Examiner* — Mark Monk
(74) *Attorney, Agent, or Firm* — Fitzpatrick, Cella, Harper & Scinto (57) ABSTRACT

A photoelectric conversion apparatus includes photoelectric conversion elements configured to convert incident light to electric carriers, amplifier sections configured to read signals based on the electric carriers generated in the photoelectric conversion elements, transfer sections configured to transfer electric carriers in the photoelectric conversion elements to input units of the amplifier sections, and voltage supply sections configured to set potentials of the input units, arranged in a two-dimensional array. The photoelectric conversion apparatus further includes output lines configured to read signals from the amplifier sections and voltage supply lines configured to supply voltages to the voltage supply sections. Out of the output lines and the voltage supply lines, only one output line and one voltage supply line related to a first photoelectric conversion element are disposed between the first photoelectric conversion element and an adjacent second photoelectric conversion element.

8 Claims, 9 Drawing Sheets

FOREIGN PATENT DOCUMENTS

| | | |
|---|---|---|
| JP | 11-112018 A | 4/1999 |
| JP | 11-312800 A | 11/1999 |
| JP | 11-355668 A | 12/1999 |
| JP | 2001-230400 A | 8/2001 |
| JP | 2001-332714 A | 11/2001 |
| JP | 2002-50752 A | 2/2002 |
| JP | 2004-172950 A | 6/2004 |
| JP | 2004-186407 A | 7/2004 |
| JP | 2005-5911 A | 1/2005 |
| JP | 2005-198001 A | 7/2005 |
| JP | 2005-228956 A | 8/2005 |
| JP | 2007-123876 A | 5/2007 |

* cited by examiner

PHOTOELECTRIC CONVERSION APPARATUS AND IMAGE PICKUP SYSTEM USING THE SAME

BACKGROUND OF THE INVENTION

1. Field of the Invention

The present invention relates to a photoelectric conversion apparatus and an image pickup system using the same.

2. Description of the Related Art

Image pickup apparatuses in which metal oxide semiconductor (MOS) type photoelectric conversion apparatuses are used are actively developed. MOS type photoelectric conversion apparatuses are typical photoelectric conversion apparatuses. Amplifier solid-state image pickup apparatuses are disclosed as an example.

In an amplifier solid-state image pickup apparatus, since the number of MOS transistors, for reading signals or processing signals, that are disposed in the photoelectric conversion area is large, the light receiving area tends to be narrow compared with that of a charge-coupled device (CCD) type solid-state image pickup apparatus.

In such a situation, structures in which the number of MOS transistors is reduced are considered so as to expand the light receiving area of a photoelectric conversion element. For example, a photoelectric conversion apparatus is disclosed in Japanese Patent Laid-Open No. 11-355668, in which pixels are selected row by row by controlling the drain potential of a reset MOS transistor. Moreover, another photoelectric conversion apparatus is disclosed in Japanese Patent Laid-Open No. 2005-005911, in which pixels are selected row by row by controlling, with a pixel power supply drive circuit, the drain potentials of a reset transistor and an amplifier transistor that are commonly connected.

However, although equivalent circuits and reading methods in the structures in which the number of MOS transistors is reduced are considered, layouts in a case where devices are actually formed are not thoroughly considered.

For example, in the photoelectric conversion apparatus disclosed in Japanese Patent Laid-Open No. 2005-005911, selection or non-selection of pixels is controlled by supplying a voltage to the drains of the reset transistor and the amplifier transistor using a selection line. However, an actual wiring layout is not thoroughly considered. For example, since a vertical output line for reading signals and a selection line are placed in parallel, correct signals may not be read because the selection line may be affected by a change in the potential of the vertical output line.

In view of such problems, in the present invention, the influence of noise between a line for supplying a voltage to the drain of a reset transistor and an output line is reduced.

SUMMARY OF THE INVENTION

To solve the aforementioned problems, the present invention provides an amplifier solid-state image pickup apparatus that includes a plurality of unit pixels arranged in a two-dimensional array. Each of the unit pixels includes at least a photoelectric conversion element unit, a transfer transistor, a reset transistor, an amplifier transistor, and a floating diffusion. In each of the unit pixels, the same potential is supplied to the drain of the reset transistor and the drain of the amplifier transistor. A drain potential of the reset transistor is supplied via a vertical wiring line. A pixel output line and a vertical wiring line for supplying a drain potential included in the same unit pixel are disposed so that the pixel output line and the vertical wiring line are adjacent to each other without a photoelectric conversion unit therebetween.

Other features and advantages of the present invention will be apparent from the following description taken in conjunction with the accompanying drawings, in which like reference characters designate the same or similar parts throughout the figures thereof.

DESCRIPTION OF THE EMBODIMENTS

The present invention will now be described in detail with reference to exemplary embodiments.

First Exemplary Embodiment

Figure 1A:
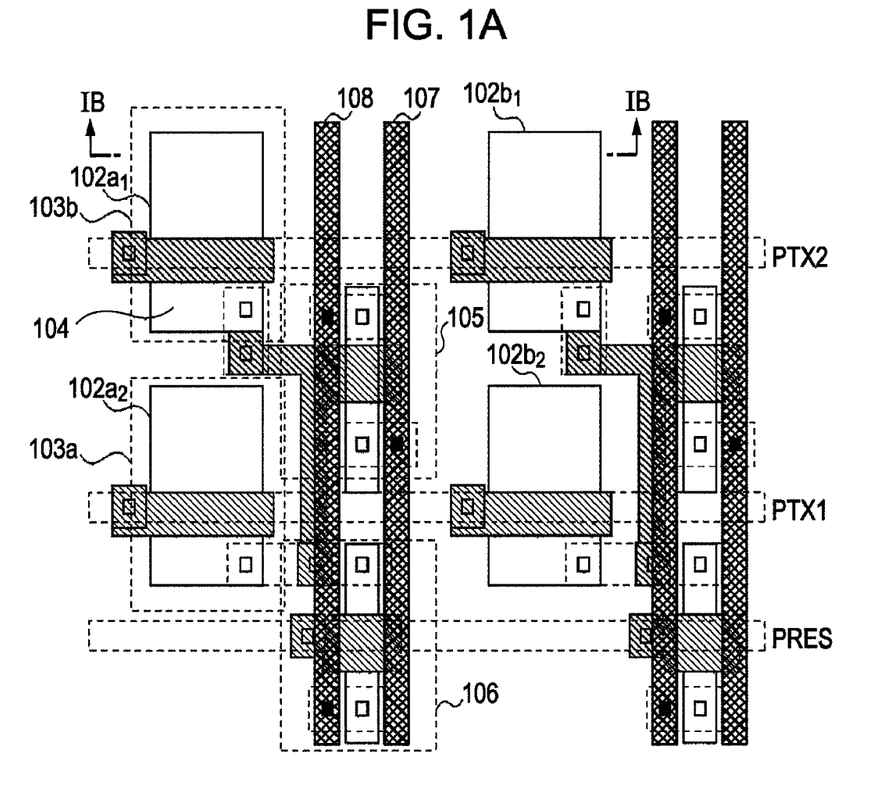
FIG. 1A is a plan view of a photoelectric conversion apparatus according to a first exemplary embodiment.
Figure 1B:
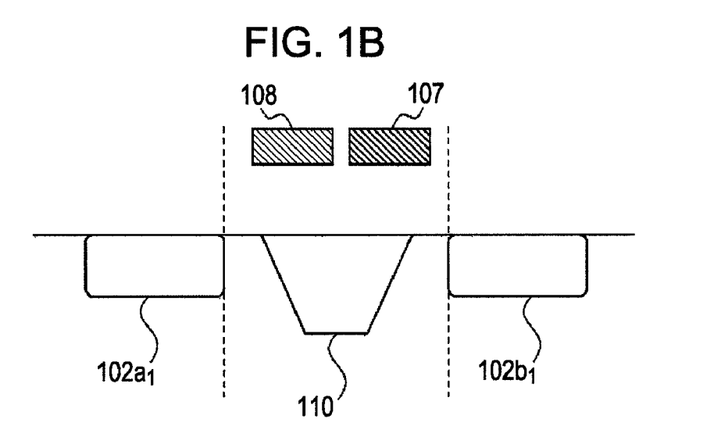
FIG. 1B is a cross sectional view of the photoelectric conversion apparatus according to the first exemplary embodiment.

FIG. 1A shows the wiring layout of a photoelectric conversion apparatus according to a first exemplary embodiment. FIG. 1B is a cross sectional view taken along line IB-IB in FIG. 1A. A photoelectric conversion element 102 converts incident light into electric carriers. A transfer section 103 transfers electric carriers in the photoelectric conversion element 102 to an input unit 104 in an amplifier section. A MOS transistor can be used as the transfer section 103. A floating diffusion (FD) formed on a semiconductor substrate can be used as the input unit 104. An amplifier MOS transistor 105 constitutes a part of the amplifier section. The gate of the amplifier MOS transistor 105 is electrically connected to the FD. A known source follower circuit that includes an amplifier transistor is formed, and signals are amplified with this source follower circuit.

A voltage supply section 106 supplies voltages to the FD. A MOS transistor can be used as the voltage supply section 106. In particular, a reset MOS transistor that can set the potential of the FD at a predetermined value can be used as the voltage supply section 106.

A pixel here represents an element set for reading signals from a single photoelectric conversion element and includes a transfer MOS transistor, a reset MOS transistor, and an amplifier MOS transistor. Adjacent photoelectric conversion elements can share the aforementioned elements. Even in this case, a pixel is defined as an element set for reading signals from photoelectric conversion elements.

An output line 107 is used to read signals based on electric carriers in the photoelectric conversion element 102. A voltage supply line 108 is used to supply voltages to the voltage supply section 106. Specifically, voltages are supplied to the drain of a transistor. Moreover, the voltage supply line 108 can be used to supply voltages to the drain of the amplifier MOS transistor 105.

A plurality of the voltage supply lines 108 extend in a first direction (the vertical direction). Each of the voltage supply lines 108 can be connected to horizontal wiring lines at an area outside a photoelectric conversion area. Since the horizontal wiring lines are located on the outside of the photoelectric conversion area, each of the horizontal wiring lines can be formed of a thick wire such that a voltage drop due to a load current does not create a problem. In the exemplary embodiment, a current that runs through each of the voltage supply lines 108 is only a current that runs through the amplifier MOS transistor 105. Thus, the influence of a voltage drop can be reduced.

The output line 107 for reading signals based on electric carriers in a first photoelectric conversion element 102a is disposed between the first photoelectric conversion element 102a and a second photoelectric conversion element 102b, which are adjacent to each other. Moreover, the voltage supply line 108 for supplying voltages to the FD to which electric carriers in the first photoelectric conversion element 102a are transferred is disposed. Accordingly, an output line and a voltage supply line involved in reading of signals based on electric carriers in the same photoelectric conversion element are disposed so that the output line and the voltage supply line are adjacent to each other. In this case, although photoelectric conversion elements corresponding to only two columns are shown, this set of photoelectric conversion elements is disposed repeatedly. Photoelectric conversion elements $102a_1$, $102a_2$, . . . and photoelectric conversion elements $102b_1$, $102b_2$, . . . form respective photoelectric conversion element groups. When photoelectric conversion elements and MOS transistors are arranged in a matrix as in ordinary cases, each of the photoelectric conversion element groups forms a photoelectric conversion element column.

A cross section taken along line IB-IB in FIG. 1A will now be described with reference to FIG. 1B. The output line 107 and the voltage supply line 108 are disposed between the adjacent photoelectric conversion elements $102a_1$ and $102b_1$ so that a side where light enters is nearer to the output line 107 and the voltage supply line 108 than to the photoelectric conversion elements $102a_1$ and $102b_1$, as shown in FIG. 1B. In other words, the orthogonal projections of the output line 107 and the voltage supply line 108 onto a plane that includes the light receiving surfaces of the photoelectric conversion elements $102a_1$ and $102b_1$ can be said to be located between the adjacent photoelectric conversion elements $102a_1$ and $102b_1$. Photoelectric conversion elements form element columns extending in the first direction, and the aforementioned components can be said to be disposed between a first element column that includes the photoelectric conversion elements 102a and a second element column, adjacent to the first element column, that includes the photoelectric conversion elements 102b. Moreover, only a pair of one of the output lines 107 and one of the voltage supply lines 108 is disposed between the first and second element columns.

Only an output line and a voltage supply line involved in reading of signals based on electric carriers in the same photoelectric conversion element are disposed between corresponding element columns in this way, so that the signals based on the electric carriers in the photoelectric conversion element can be read appropriately. This will now be described in detail.

Figure 2:
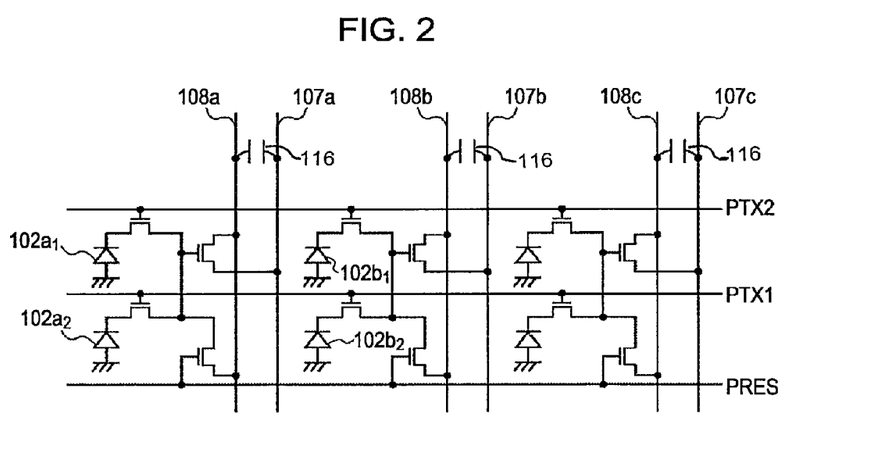
FIG. 2 is a view for describing parasitic capacitance between wiring lines in the photoelectric conversion apparatus according to the first exemplary embodiment.
Figure 3:
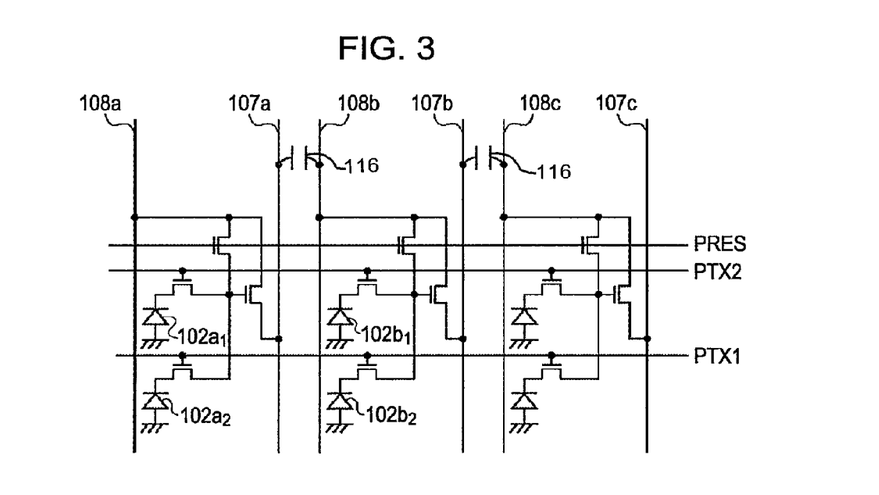
FIG. 3 is a view for describing parasitic capacitance between wiring lines in a photoelectric conversion apparatus.

FIGS. 2 and 3 are used to describe the aforementioned noise in detail. An exemplary arrangement will first be described with reference to FIG. 3, in which the influence of the noise is strong.

FIG. 3 shows an example in which an output line 107a corresponding to one element column and a voltage supply line 108b for supplying voltages to the drains of reset MOS transistors in another element column adjacent to the one element column are disposed so that the output line 107a and the voltage supply line 108b are adjacent to each other.

When one of the output lines 107 is adjacent to one of the voltage supply lines 108, parasitic capacitance 116 is formed between the lines. In the case of a structure shown in FIG. 3, for example, parasitic capacitance 116 is formed between the output line 107a for a column a and the voltage supply line 108b for a column b. In a case where strong light enters the photoelectric conversion elements 102a in the column a, when signals are output via amplifier MOS transistors, the potential of the output line 107a significantly drops. At this time, the potential of the voltage supply line 108b instantaneously drops due to the influence of the parasitic capacitance 116 between the output line 107a and the voltage supply line 108b. Since voltages are supplied to the drains of amplifier MOS transistors in the column b via the voltage supply line 108b, the potential of an output line 107b is also affected by the influence of the parasitic capacitance 116. It takes time for the potential of the voltage supply line 108b to stabilize. Thus, especially when the reading period is shortened, signals from the column b may not be correctly output via the output line 107b. This causes a problem in which, for example, when an image of a subject in which the boundary between a black portion and a white portion is clear is captured, an image in which the boundary becomes gray is obtained. Such a phenomenon is a problem that occurs when a voltage supply line is formed so as to extend in the same direction as an output line. Such a phenomenon may occur even between output lines in a similar manner. Moreover, such a phenomenon may occur even when voltages are not supplied to the drains of amplifier MOS transistors via a voltage supply line.

In the exemplary embodiment, a pair of one of the output lines 107 and one of the voltage supply lines 108 disposed between corresponding adjacent photoelectric conversion elements is connected to reset MOS transistors and amplifier MOS transistors disposed in a corresponding column, as shown in FIG. 2.

In the case shown in FIG. 2, even when the potential of the output line 107a significantly drops at the time of reading signals, only a voltage supply line for the column a is affected. Thus, the influence of the potential drop on an image in the arrangement shown in FIG. 2 is smaller than that in the arrangement shown in FIG. 3. That is to say, since the potential of the output line 107a has already dropped significantly due to electric carriers generated from strong light, even when the drain potentials of amplifier MOS transistor are affected by the potential drop, the influence on output signals can be reduced.

The operation of the photoelectric conversion apparatus will now be described with reference to an equivalent circuit diagram in FIG. 4 and a timing chart in FIG. 5.

Figure 4:
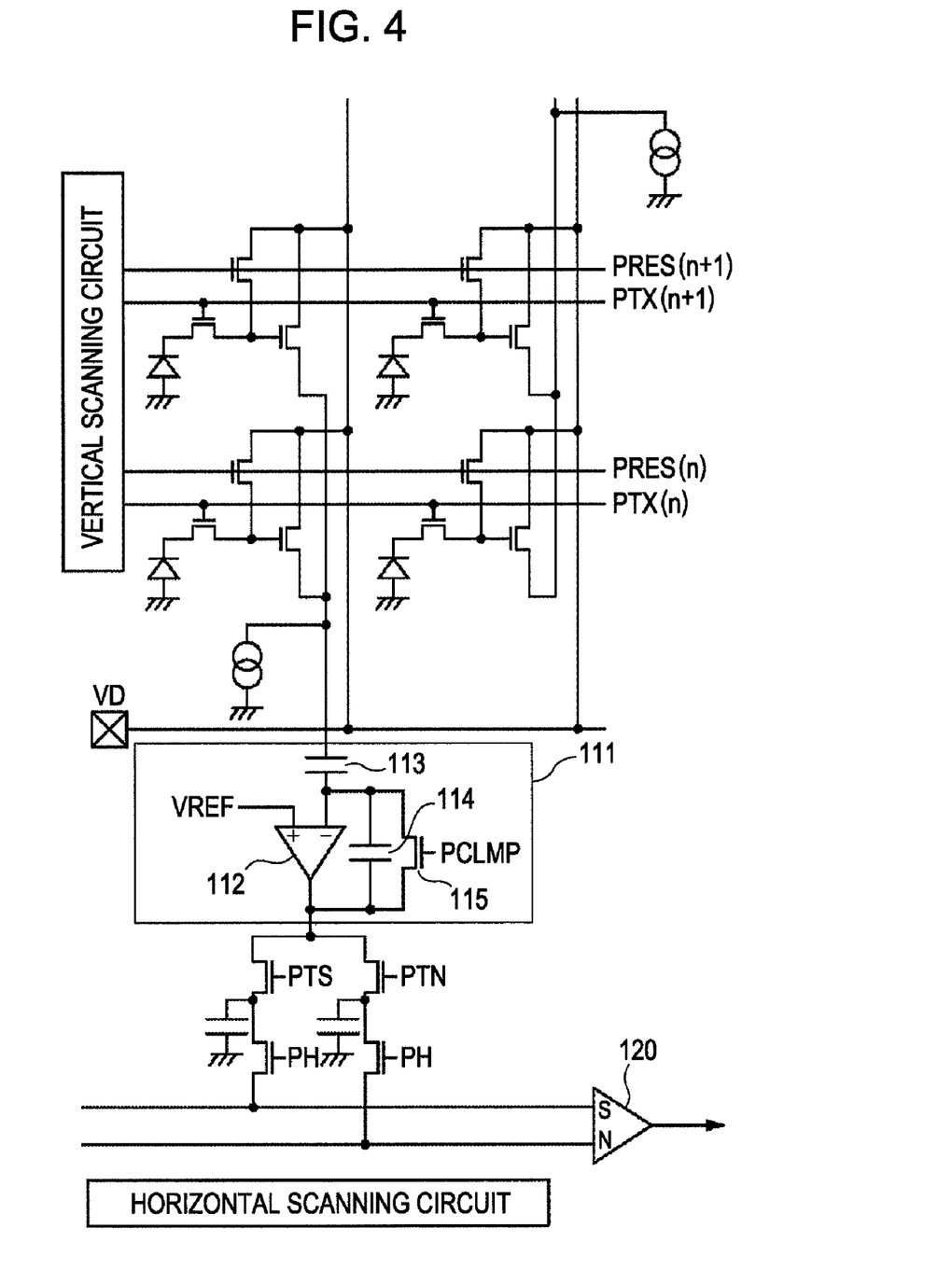
FIG. 4 is an equivalent circuit diagram of the photoelectric conversion apparatus according to the first exemplary embodiment.

In FIG. 4, pixels are arranged in a matrix in a photoelectric conversion area. A row is selected by using a difference in the gate potential of an amplifier MOS transistor. Specifically, a row is selected by setting the gate potentials of amplifier MOS transistors in a row to be not selected at a low level and setting the gate potentials of amplifier MOS transistors in a row to be selected at a high level. An output line is an output node of a source follower circuit formed by an amplifier MOS transistor in a selected row and a constant current load, and the potential of the output line is set at a potential based on the potential of FDs in a selected row, so that amplifier MOS transistors in a row that is not selected are turned off.

Figure 5:
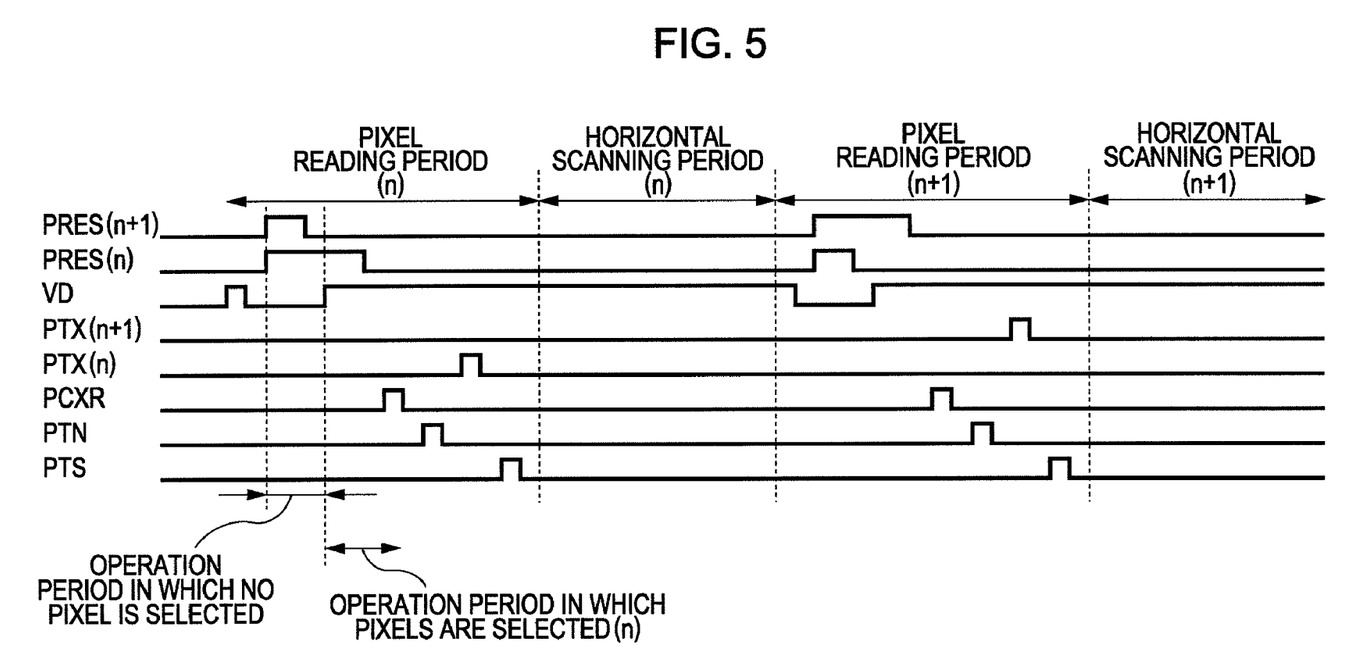
FIG. 5 is a timing chart of the photoelectric conversion apparatus according to the first exemplary embodiment.

As shown in FIG. 5, in an operation period in which no pixel is selected in a pixel reading period (n), reset signals PRES(n) and PRES(n+1) of all rows are set at a high level by a vertical scanning circuit, and FDs in all pixels are set at a low level via voltage supply lines and reset transistors. At this time, a level VD of the voltage supply lines is at a low level. Subsequently, in an operation period in which pixels are selected (n), a reset signal for rows other than a selected row (the n-th row) is at a low level, the level VD of the voltage supply lines is at a high level, FDs in the selected row are set at a high level, and the reset signal PRES(n) is again set at a low level. At this time, outputs corresponding to the reset state are read to output lines. In this example, an amplifier circuit 111 (a column amplifier) is formed for each column. A column amplifier includes, for example, an operational amplifier 112 in which a differential amplifier circuit or the like is used, an input capacitance 113, a feedback capacitance 114, and a clamp control switch 115.

Figure 6:
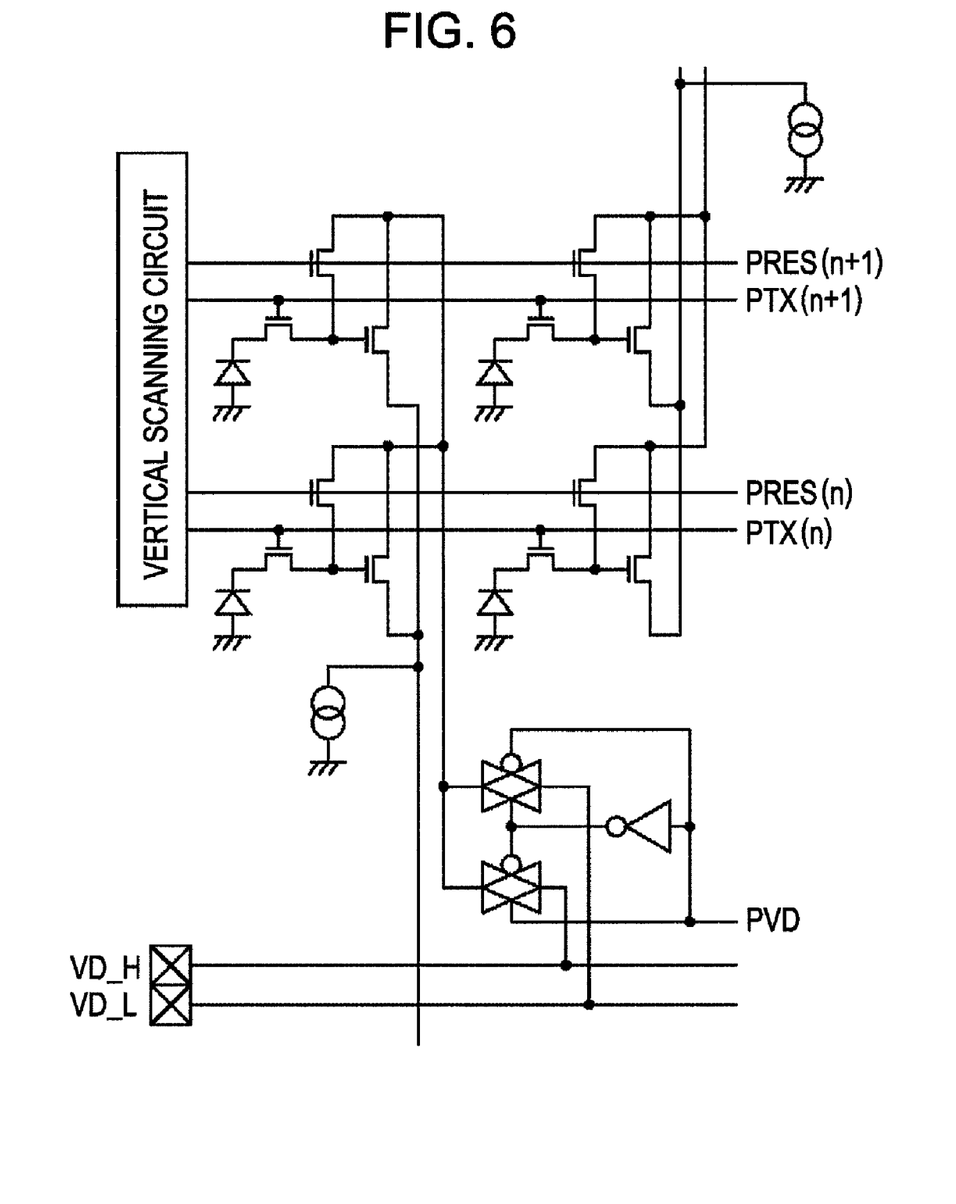
FIG. 6 is another equivalent circuit diagram of the photoelectric conversion apparatus according to the first exemplary embodiment.

Then, in a horizontal scanning period (n), a horizontal transfer operation is performed. Specifically, an N signal and an S signal from a column selected by a horizontal scanning circuit are read one by one, and then light response outputs from pixels in the n-th row are obtained by obtaining the difference between the corresponding N and S signals with a differential amplifier 120. Light response outputs from all pixels in a screen are obtained by scanning, with the vertical scanning circuit, a row to be selected and repeating the aforementioned operation of reading pixels. In this example, a power supply voltage can be set at about 3.3 V, the low level of VD can be set at about 0.3 V to 1.0 V, and the high level of VD can be set at about 3.3 V. In this example, VD is supplied from an input terminal. However, the present invention is not limited to this example, and, for example, a method may be adopted, in which selection is made between the high and low levels with a switch, as shown in FIG. 6. In this case, the high level of VD indicated by VD_H is supplied to the drains of reset MOS transistors by setting PVD at the high level, and the low level of VD indicated by VD_L is supplied to the drains of the reset MOS transistors by setting PVD at the low level. In this drawing, top and bottom reading circuits are omitted.

The arrangement shown in FIG. 1 will now be described in detail. The drain of a reset MOS transistor and the drain of an amplifier MOS transistor are formed in different active regions. In a case where such a planar structure is adopted, the level of reduction in the load capacitance of a voltage supply line is high compared with that in a case where connection to the drain of a reset MOS transistor and the drain of an amplifier MOS transistor is implemented by extending an active region. Thus, the reading period can be further shortened. In the drawing, a system at the top, out of systems at the top and bottom, is omitted, each of the systems including a reading circuit and a voltage supply circuit.

In general, display screens of image pickup apparatuses are landscape, for example, 16:9, 4:3, or 3:2. Thus, the load capacitance and load resistance of a voltage supply line in the exemplary embodiment are small compared with those in known arrangements. Accordingly, the time necessary to read pixels can be reduced.

Moreover, when horizontal wiring lines are formed of a first wiring layer of metal and vertical wiring lines are formed of a second wiring layer of metal, since the number of the horizontal wiring lines is the same as the number of the vertical wiring lines, a problem in which the aperture width is extremely small is eliminated. Thus, a decrease in the sensitivity or a decrease in the sensitivity around a pixel area can be suppressed.

Second Exemplary Embodiment

A second exemplary embodiment is different from the first exemplary embodiment in the relative positions of an output line and a voltage supply line. In the first exemplary embodiment, a voltage supply line is disposed in a position that overlaps a wiring line for connecting FDs. On the other hand, in the second exemplary embodiment, a voltage supply line is disposed in a position that does not overlap a wiring line for connecting FDs.

Figure 7:
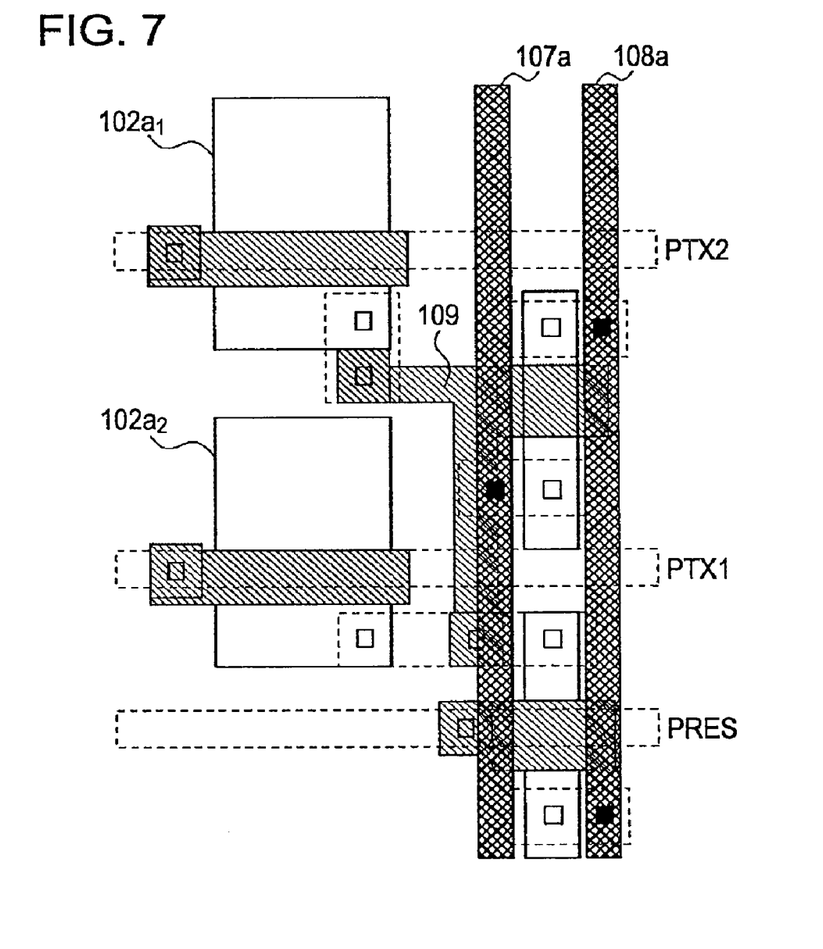
FIG. 7 is a plan view of a photoelectric conversion apparatus according to a second exemplary embodiment.
Figure 8:
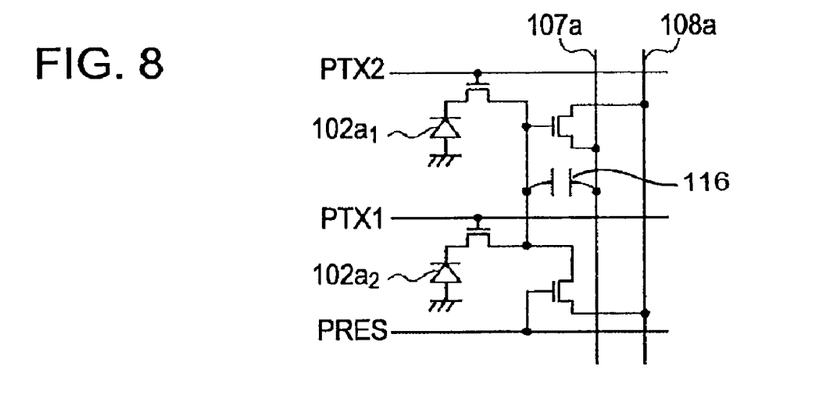
FIG. 8 is a view for describing parasitic capacitance between wiring lines in the photoelectric conversion apparatus according to the second exemplary embodiment.

FIG. 7 is a layout plan of the second exemplary embodiment. A voltage supply line 108a is disposed in a position that does not overlap a wiring line for connecting FDs. In this example in which a plurality of photoelectric conversion elements 102 arranged in the vertical direction constitute a unit structure and the voltage supply line 108a vertically extends, parasitic capacitance 116 in an area where the wiring line for connecting the FDs overlaps the voltage supply line 108a may be large. FIG. 8 is an equivalent circuit diagram that includes parasitic capacitance 116 formed between the wiring line for connecting the FDs and the voltage supply line 108a. The drive time of the voltage supply line 108a depends on the parasitic capacitance 116 and the parasitic resistance. In particular, in a structure in which a row is selected by using a difference in the gate potential of an amplifier MOS transistor, in many cases, the amplitude of a voltage supply line is much larger than the amplitude of an output line. Thus, reducing the parasitic capacitance 116 of a voltage supply line is effective in shortening the reading period. In the structure shown in FIG. 8, an output line overlaps a wiring layer for connecting the FDs. Thus, the influence on the voltage supply line is small, so that the pixel reading period can be shortened.

Moreover, in the equivalent circuit diagram shown in FIG. 8, parasitic capacitance 116 for the wiring line for connecting the FDs is reduced. This is because the potential of an FD in a selected row and the potential of the output line fluctuate in the same direction. Thus, the efficiency of conversion from a signal carrier to a signal voltage can be improved, so that the signal-to-noise (S/N) ratio can be improved.

Third Exemplary Embodiment

Figure 9:
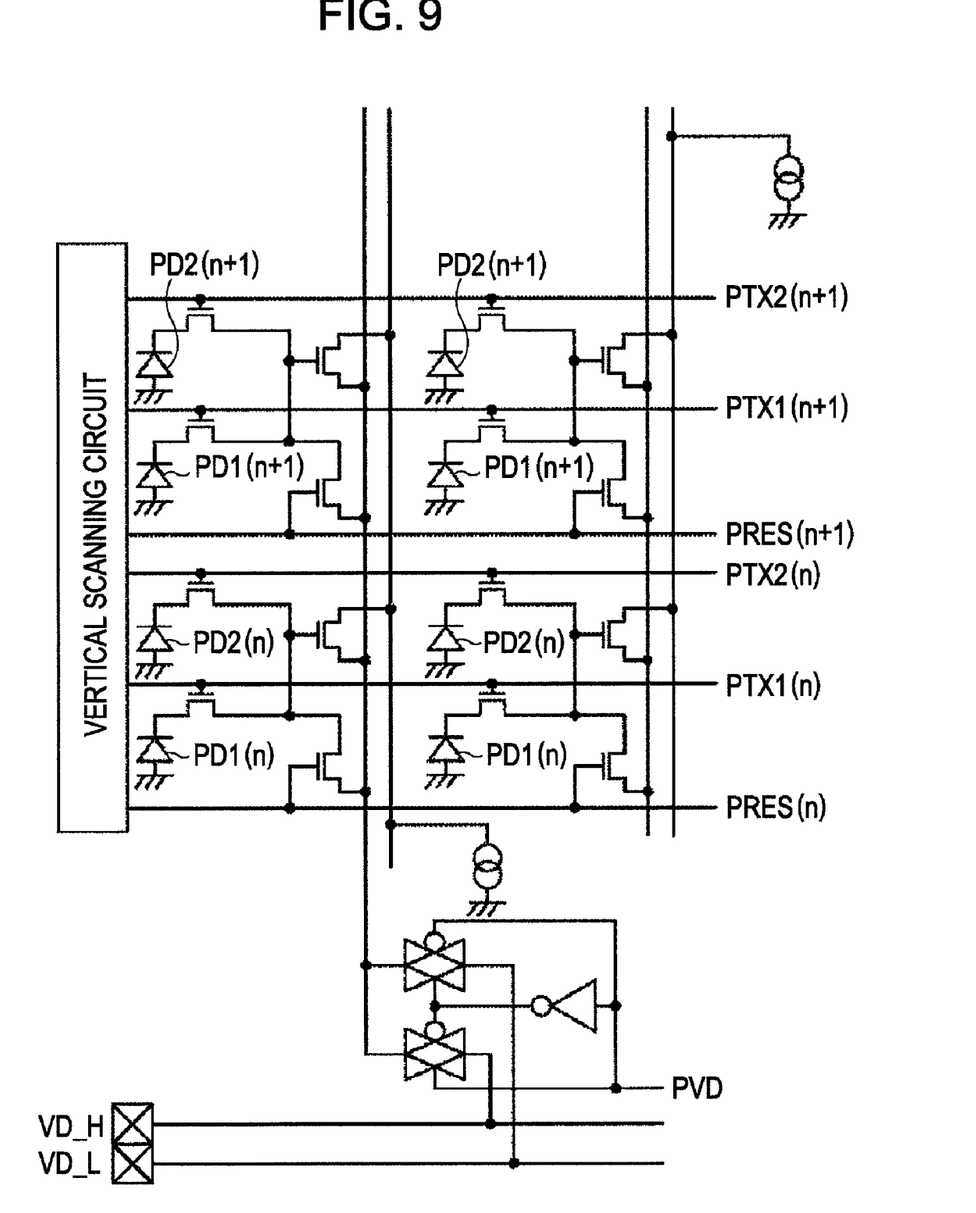
FIG. 9 is an equivalent circuit diagram of a photoelectric conversion apparatus according to a third exemplary embodiment.

FIG. 9 is an equivalent circuit diagram of a photoelectric conversion apparatus according to a third exemplary embodiment. In this case, FIG. 9 shows a part of the photoelectric conversion apparatus corresponding to eight pixels out of a plurality of pixels arranged in a two-dimensional array. In the drawing, reading circuits and voltage supply circuits at the top and bottom are omitted.

The third exemplary embodiment is different from the first exemplary embodiment in that an FD, an amplifier MOS transistor, and a reset MOS transistor are provided for each set of two photoelectric conversion elements and two transfer gates corresponding to the photoelectric conversion elements. In other words, a plurality of photoelectric conversion elements share these elements.

Figure 10:
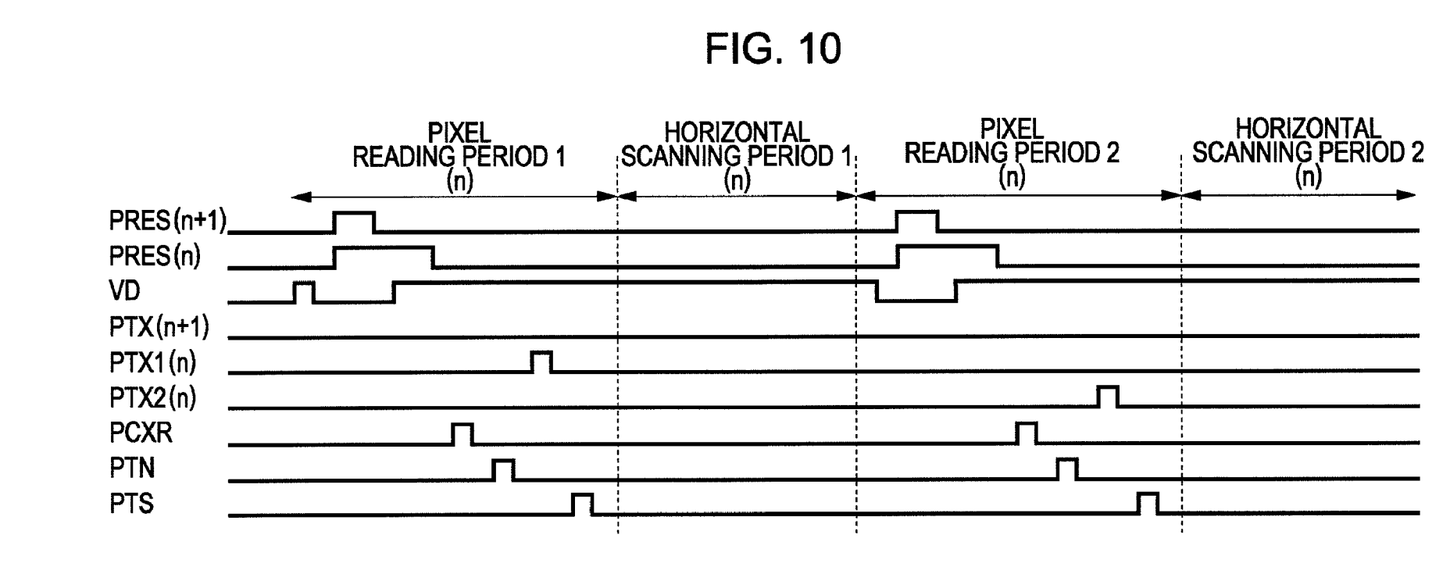
FIG. 10 is a timing chart of the photoelectric conversion apparatus according to the third exemplary embodiment.

In the photoelectric conversion apparatus shown in the equivalent circuit diagram, light response outputs from photoelectric conversion elements indicated by PD1($n$) in the n-th row are obtained in a pixel reading period 1 ($n$) and a horizontal scanning period 1 ($n$), and light response outputs from photoelectric conversion elements indicated by PD2($n$) in the n-th row are obtained in a pixel reading period 2 ($n$) and a horizontal scanning period 2 ($n$), as shown in a timing chart in FIG. 10. Similarly, light response outputs from photoelectric conversion elements indicated by PD1($n$+1) in the (n+1)-th row are obtained, and light response outputs from photoelectric conversion elements indicated by PD2($n$+1) in the (n+1)-th row are obtained.

In the third exemplary embodiment, the read speed, shading, and the sensitivity are improved, as in the first exemplary embodiment.

In the third exemplary embodiment, an FD, an amplifier MOS transistor, and a reset MOS transistor are provided for each set of two photoelectric conversion elements and two transfer gates corresponding to the photoelectric conversion elements. However, the present invention is not limited to this case. The present invention is also applicable to, for example, a case where an FD, an amplifier MOS transistor, and a reset MOS transistor are provided for each set of four photoelectric conversion elements and four transfer gates corresponding to the photoelectric conversion elements.

Fourth Exemplary Embodiment

Figure 11:
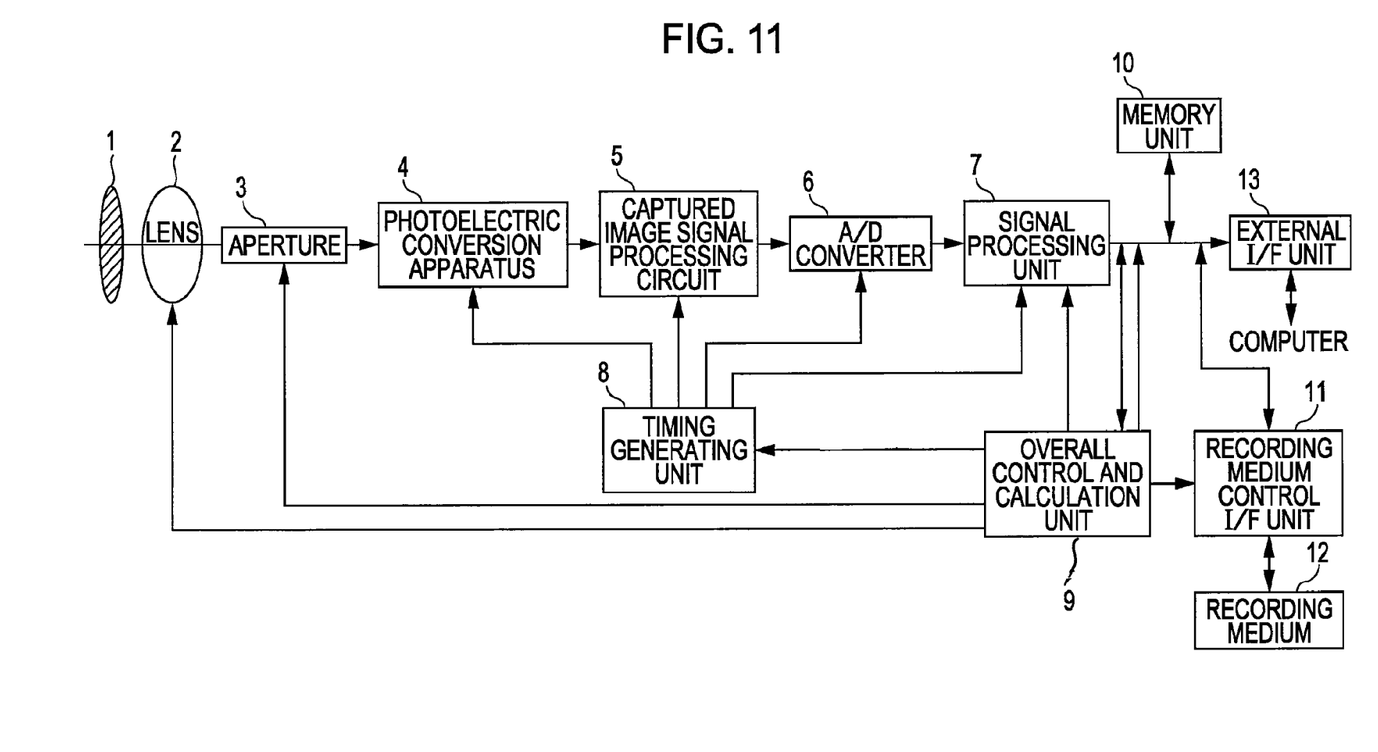
FIG. 11 shows an exemplary image pickup system in which a photoelectric conversion apparatus is used.

FIG. 11 is a block diagram of a solid-state image pickup system in which any one of the photoelectric conversion apparatuses described in the first to third exemplary embodiments is used. A barrier 1 functions as a protector for a lens 2 and a main switch. The lens 2 is used to form an optical image of a subject on a photoelectric conversion apparatus 4. An aperture 3 adjusts the amount of light having passed through the lens 2. The photoelectric conversion apparatus 4 captures the image of the subject formed with the lens 2 as image signals. A captured image signal processing circuit 5 performs various types of processing, for example, various types of correction and clamping, on image signals output from the photoelectric conversion apparatus 4. An analog-to-digital (A/D) converter 6 performs A/D conversion on image signals output from the photoelectric conversion apparatus 4. A signal processing unit 7 performs various types of correction on image data output from the A/D converter 6 and compresses the image data. A timing generating unit 8 outputs various types of timing signal to the photoelectric conversion apparatus 4, the captured image signal processing circuit 5, the A/D converter 6, and the signal processing unit 7. An overall control and calculation unit 9 performs various types of calculation and overall control of a still video camera. A memory unit 10 temporarily stores image data. A recording medium control interface (I/F) unit 11 is used to record or read data on or from a recording medium. A recording medium 12 is a detachable medium on or from which image data is recorded or read, for example, a semiconductor memory. An external I/F unit 13 is used to communicate with an external computer and the like.

The operation of the solid-state image pickup system shown in FIG. 11 will now be described. When the barrier 1 is opened, a main power supply is turned on, the power supply of a control system is turned on, and then the power supply of image pickup circuits, such as the A/D converter 6, is turned on. Then, the overall control and calculation unit 9 opens the aperture 3 so as to control the amount of exposure. Then, signals from the photoelectric conversion apparatus 4 pass through the captured image signal processing circuit 5 and are output to the A/D converter 6. The A/D converter 6 performs A/D conversion on the signals and outputs the converted signals to the signal processing unit 7. The signal processing unit 7 performs one or more exposure calculations on the basis of the obtained data using the overall control and calculation unit 9.

The brightness is determined on the basis of the result of the light metering, and the overall control and calculation unit 9 controls the aperture 3 on the basis of the result of the brightness determination. Then, the overall control and calculation unit 9 picks up high frequency components from the signals output from the photoelectric conversion apparatus 4 and calculates the distance to the subject. Then, it is determined by driving the lens 2 whether focus is achieved. When it is determined that focus is not achieved, focusing is performed by driving the lens 2 again.

When it is determined that focus is achieved, actual exposure is started. After exposure is completed, the captured image signal processing circuit 5 performs correction and the like on image signals output from the photoelectric conversion apparatus 4, the A/D converter 6 performs A/D conversion on the processed signals, and the converted signals pass through the signal processing unit 7 and are stored in the memory unit 10 by the overall control and calculation unit 9. Subsequently, the data stored in the memory unit 10 is recorded on the recording medium 12 via the recording medium control I/F unit 11 under the control of the overall control and calculation unit 9. The stored image may be input directly to, for example, a computer via the external I/F unit 13, and the image may be processed.

The aforementioned exemplary embodiments can be combined appropriately without departing from the gist of the present invention. In the description of the exemplary embodiments, cases where electrons are used as signal carriers were described. Alternatively, holes may be used. In this case, the relationship between a voltage in a case where pixels are selected and a voltage in a case where no pixel is selected is reversed. Moreover, the exemplary embodiments were described assuming that the transistors are MOS transistors. However, the transistors are not limited to MOS transistors, and, for example, junction field effect transistors (JFETs) may be used as the transistors.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-209754 filed Aug. 1, 2006, which is hereby incorporated by reference herein in its entirety.

What is claimed is:

1. A photoelectric conversion apparatus comprising:
   a plurality of pixels, each pixel comprising:
      a photoelectric conversion element configured to convert incident light to electric carriers,
      an amplifier section, which includes an input unit which is a floating diffusion, configured to read signals based on the electric carriers generated in the photoelectric conversion element,
a transfer section configured to transfer the electric carriers in the photoelectric conversion elements to the input unit and
a voltage supply section, which includes a transistor having a gate and a drain, configured to set potentials of the input unit to at least first and second potentials;
a plurality of output lines configured to read signals from the amplifier sections; and
a plurality of voltage supply lines configured to supply voltages to the voltage supply sections, and which select the first potential or the second potential and supply a voltage corresponding to the selected potential to the drain of the transistor,
wherein each amplifier section is connected to one of the output lines without a select transistor therebetween,
wherein the photoelectric conversion elements, the amplifier sections, the transfer sections, and the voltage supply sections are arranged in a two-dimensional array,
wherein each pixel is changeable to a selection state in which signals are output from the amplifier sections to the output lines by the first potential, and to a non-selection state in which signals are not output from the amplifier section to the output lines by the second potential,
wherein out of the plurality of output lines and the plurality of voltage supply lines, only one output line and one voltage supply line are disposed between a first photoelectric conversion element and a second photoelectric conversion element adjacent to the first photoelectric conversion element, signals based on electric carriers generated in the first photoelectric conversion element being read through the one output line, voltages being supplied, through the one voltage supply line, to one of the voltage supply sections that sets a potential of one of the input units to which the electric carriers generated in the first photoelectric conversion element are transferred,
wherein a wiring connected to the gate of the transistors is constituted by a wiring layer different from a wiring layer of the voltage supply lines and the output lines,
wherein each of the floating diffusions is provided for a corresponding photoelectric conversion element individually, and a predetermined number of the floating diffusions are electrically connected to each other and electrically connected to a gate of a common amplifier transistor by a wiring line, and
wherein the wiring line is in a different plane from the one voltage supply line and does not overlap the one voltage supply line.

2. The photoelectric conversion apparatus according to claim 1, wherein the amplifier sections include amplifier transistors, gates of which are connected to the floating diffusions.

3. The photoelectric conversion apparatus according to claim 2, wherein a plurality of the photoelectric conversion elements share each of the amplifier transistors.

4. The photoelectric conversion apparatus according to claim 2, wherein the transistors of the voltage supply sections are reset transistors, and the drains of the reset transistors and drains of the amplifier transistors are formed in different active regions.

5. The photoelectric conversion apparatus according to claim 2, wherein voltages are supplied to the drains of the amplifier transistors through the voltage supply lines.

6. A photoelectric conversion apparatus comprising:
a plurality of pixels, each pixel comprising:
a photoelectric conversion element configured to convert incident light to electric carriers,
an amplifier section, which includes an input unit which is a floating diffusion, configured to read signals based on the electric carriers generated in the photoelectric conversion element,
a transfer section configured to transfer the electric carriers in the photoelectric conversion element to the input unit, and
a voltage supply section, including a transistor having a gate and a drain, configured to set potentials of the input unit to at least first and second potentials;
a plurality of output lines configured to read signals from the amplifier sections; and
a plurality of voltage supply lines configured to supply voltages to the voltage supply sections, and which select the first potential or the second potential and supply a voltage corresponding to the selected potential to the drain of the transistor,
wherein each amplifier section is connected to one of the output lines without a select transistor therebetween,
wherein the photoelectric conversion elements, the amplifier sections, the transfer sections, and the voltage supply sections are arranged in a two-dimensional array,
wherein each pixel is changeable to a selection state in which signals are output from the amplifier section to one of the output lines by the first potential, and to a non-selection state in which signals are not output from the amplifier section to one of the output lines by the second potential,
wherein orthogonal projections of a first output line and a first voltage supply line are placed in an area between a first photoelectric conversion element and a second photoelectric conversion element adjacent to the first photoelectric conversion element, the area being in a plane that includes light receiving surfaces of the photoelectric conversion elements, signals based on electric carriers generated in the first photoelectric conversion element being read through the first output line, voltages being supplied, through the first voltage supply line, to one of the voltage supply sections that sets a potential of one of the input units to which electric carriers generated in the first photoelectric conversion element are transferred,
wherein orthogonal projections of a second output line and a second voltage supply line are placed in an area between the second photoelectric conversion element and a third photoelectric conversion element that is adjacent to the second photoelectric conversion element and is on a side opposite to the first photoelectric conversion element, the area being in the plane, which includes the light receiving surfaces of the photoelectric conversion elements, signals based on electric carriers generated in the second photoelectric conversion element being read through the second output line, voltages being supplied, through the second voltage supply line, to one of the voltage supply sections that sets a potential of one of the input units to which electric carriers generated in the second photoelectric conversion element are transferred,
wherein a wiring connected to the gate of the transistors is constituted by a wiring layer different from a wiring layer of the voltage supply lines and the output lines,
wherein each of the floating diffusions is provided for a corresponding photoelectric conversion element individually, and a predetermined number of the floating diffusions are electrically connected to each other and electrically connected to a gate of a common amplifier transistor by a wiring line, and wherein the wiring line is in a different plane from the first voltage supply line and the second voltage supply line and does not overlap the first voltage supply line or the second voltage supply line.

7. A photoelectric conversion apparatus comprising:

a plurality of pixels, each pixel comprising:

- a photoelectric conversion element configured to convert incident light to electric carriers,
- an amplifier section, including an input unit which is a floating diffusion, configured to read signals based on the electric carriers generated in the photoelectric conversion element,
- a transfer section configured to transfer the electric carriers in the photoelectric conversion element to the input unit, and
- a voltage supply section, which includes a transistor having a gate and a drain, configured to set potentials of the input unit to at least first and second potentials;

a plurality of output lines configured to read signals from the amplifier sections; and a plurality of voltage supply lines configured to supply voltages to the voltage supply sections, and which select the first potential or the second potential and supply a voltage corresponding to the selected potential to the drain of the transistor, wherein each amplifier section is connected to one of the output lines without a select transistor therebetween, wherein the photoelectric conversion elements, the amplifier sections, the transfer sections, and the voltage supply sections are arranged in a two-dimensional array, wherein each pixel is changeable to a selection state in which signals are output from the amplifier section to one of the output lines by the first potential, and to a non-selection state in which signals are not output from the amplifier section to one of the output lines by the second potential, wherein a photoelectric conversion element group that includes a plurality of the photoelectric conversion elements is repeatedly disposed, wherein projections of one output line out of the output lines and one voltage supply line out of the voltage supply lines are repeatedly disposed in an area between the photoelectric conversion element groups, the area being in a plane that includes light receiving surfaces of the photoelectric conversion elements, the one output line and the one voltage supply line being involved in reading of signals from the same one of the photoelectric conversion element groups, wherein a wiring connected to the gate of the transistors is constituted by a wiring layer different from a wiring layer of the voltage supply lines and the output lines, wherein each of the floating diffusions is provided for a corresponding photoelectric conversion element individually, and a predetermined number of the floating diffusions are electrically connected to each other and electrically connected to a gate of a common amplifier transistor by a wiring line, and wherein the wiring line is in a different plane from the one voltage supply line and does not overlap the one voltage supply line.

8. An image pickup system comprising:

the photoelectric conversion apparatus according to claim 1;

an optical system configured to form an image on the photoelectric conversion apparatus from light; and a signal processing circuit configured to process output signals from the photoelectric conversion apparatus.

* * * * *